Dec. 3, 1935.  W. C. FAIN  2,023,356
CONCEALABLE FURNISHINGS
Filed Dec. 1, 1932  6 Sheets-Sheet 1
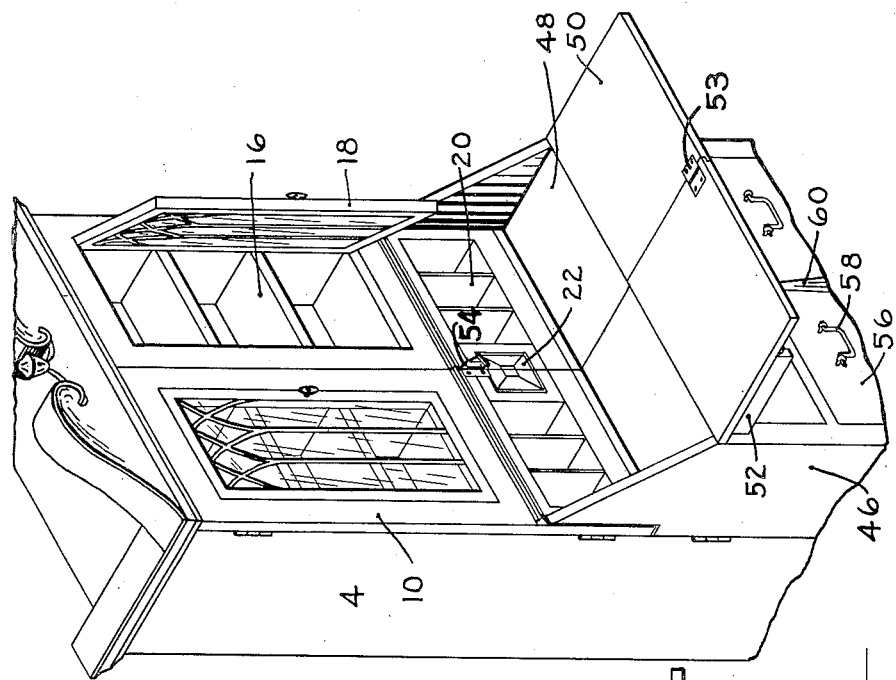
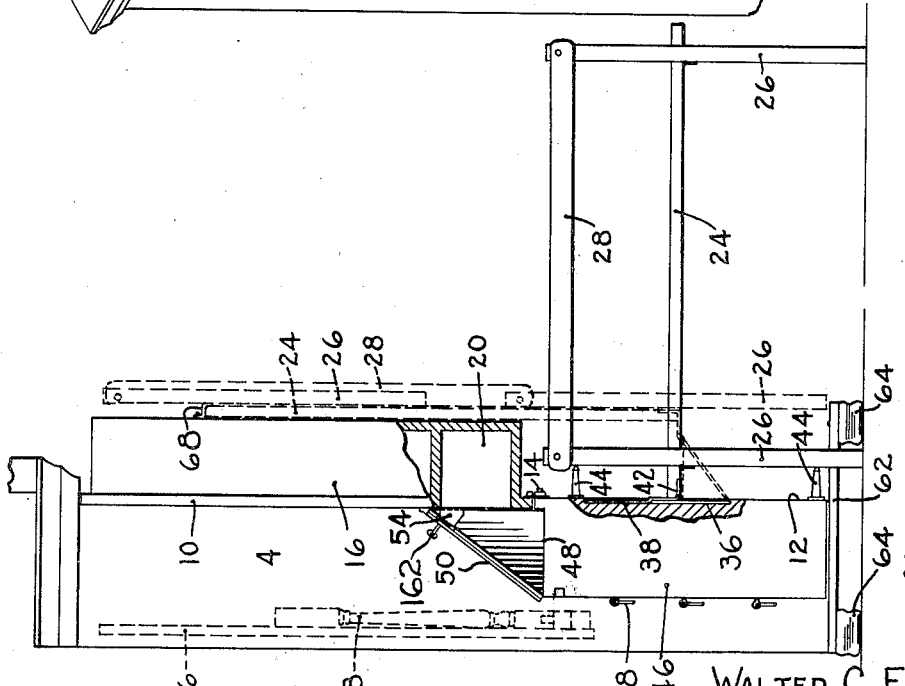

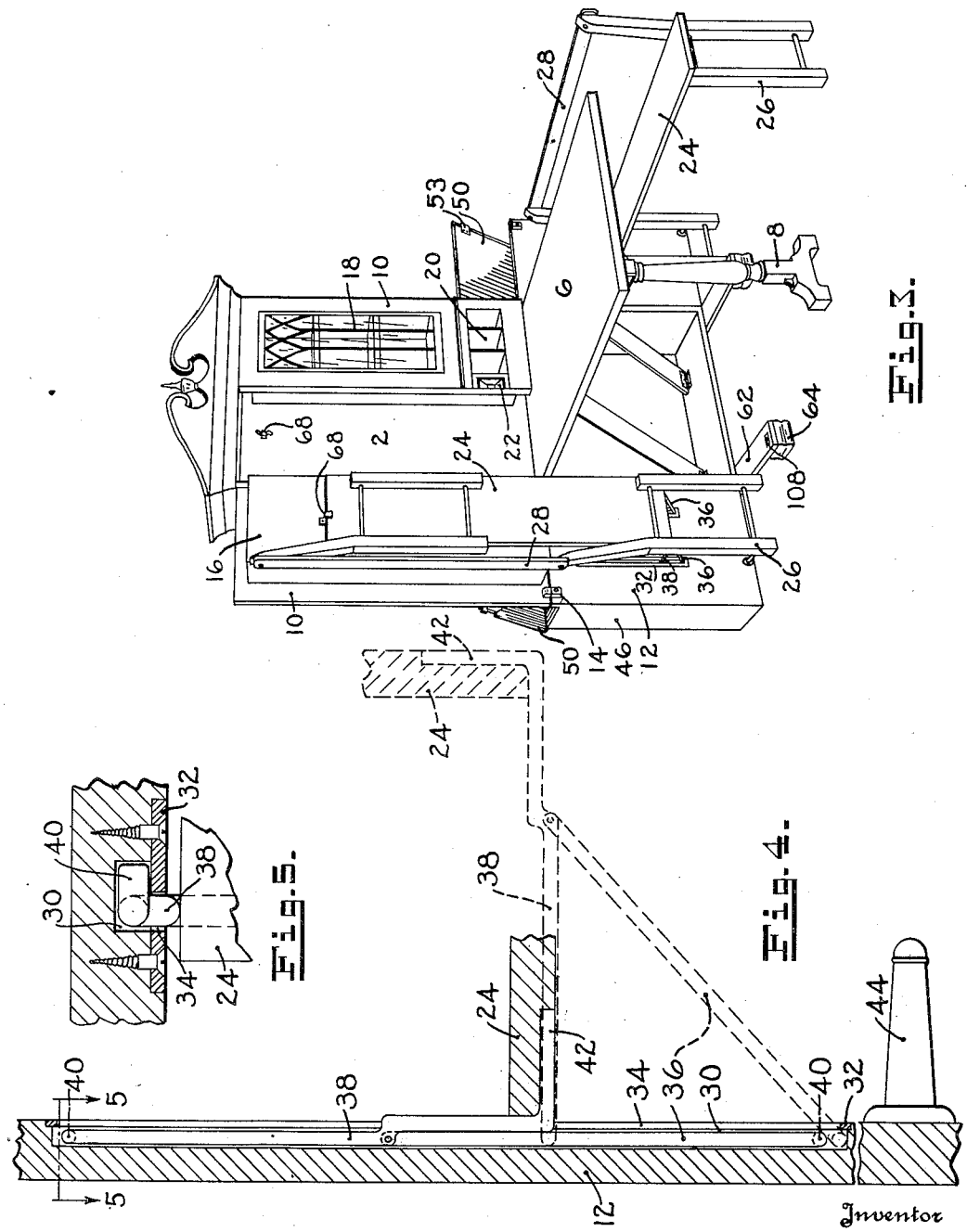

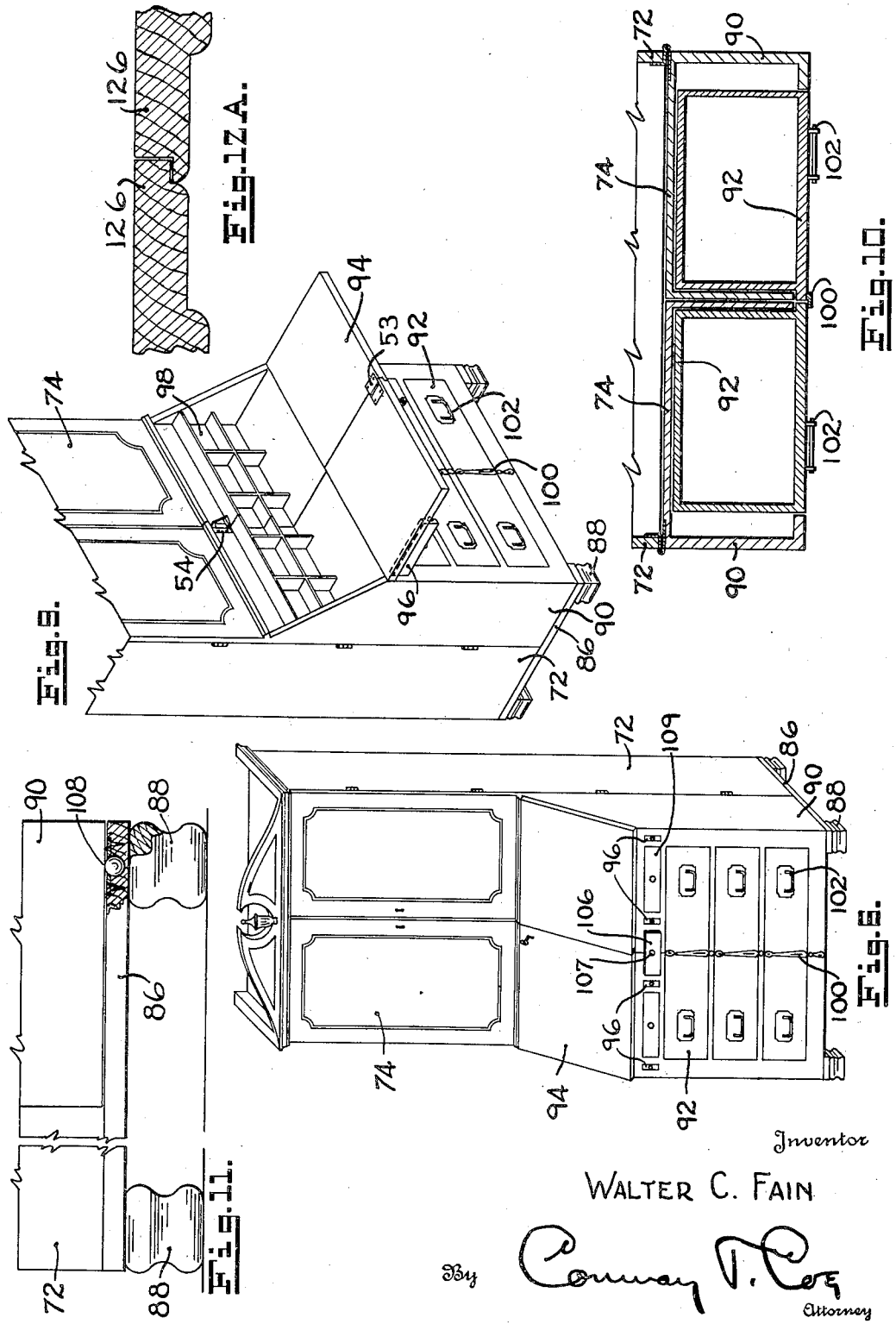

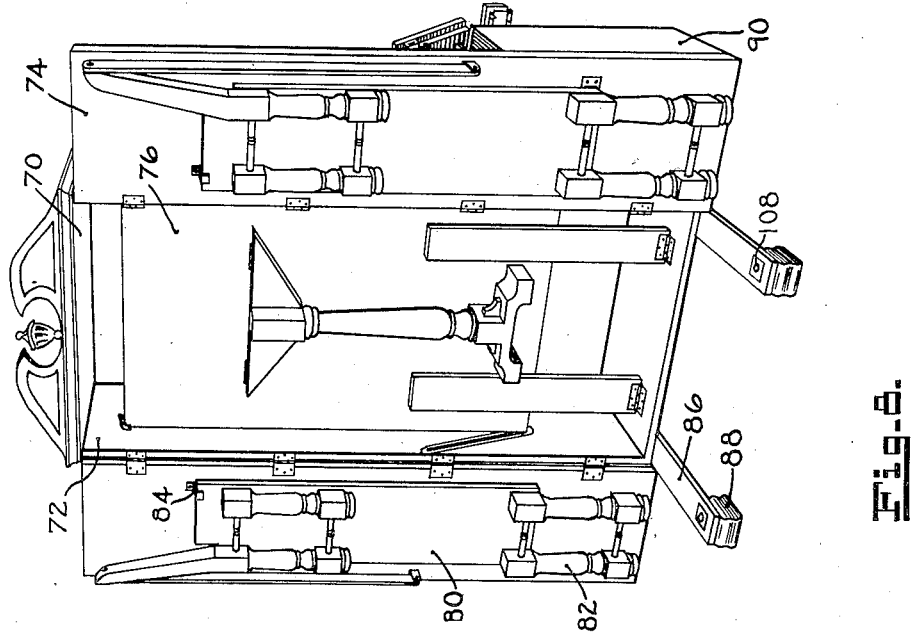
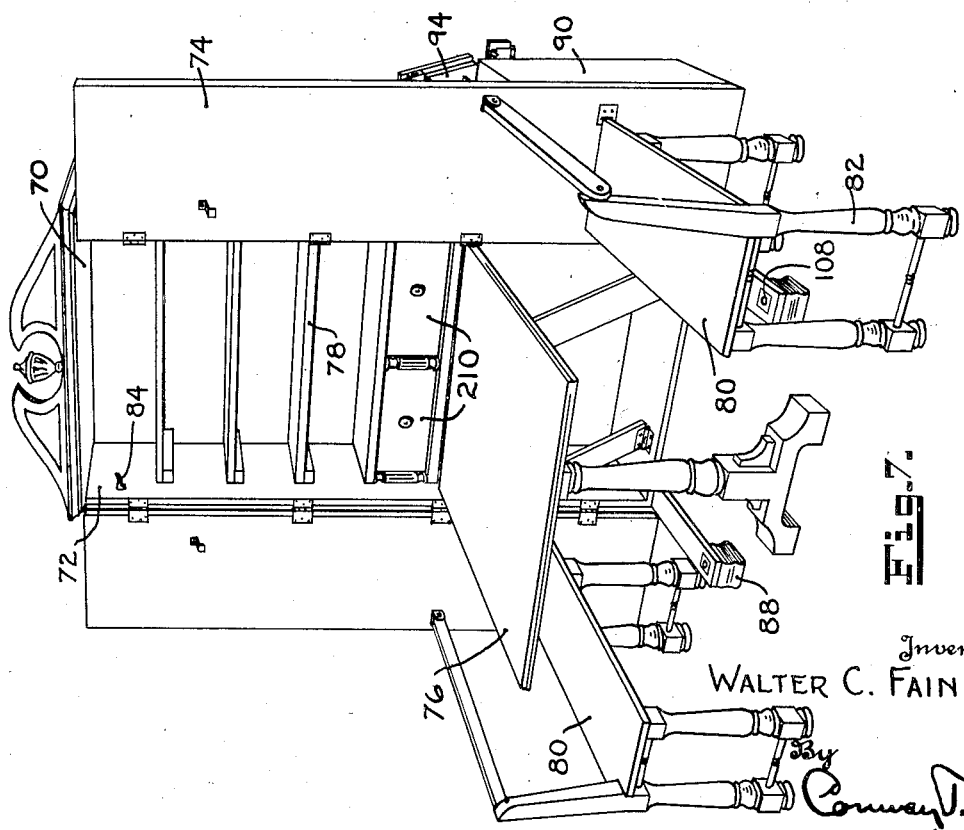

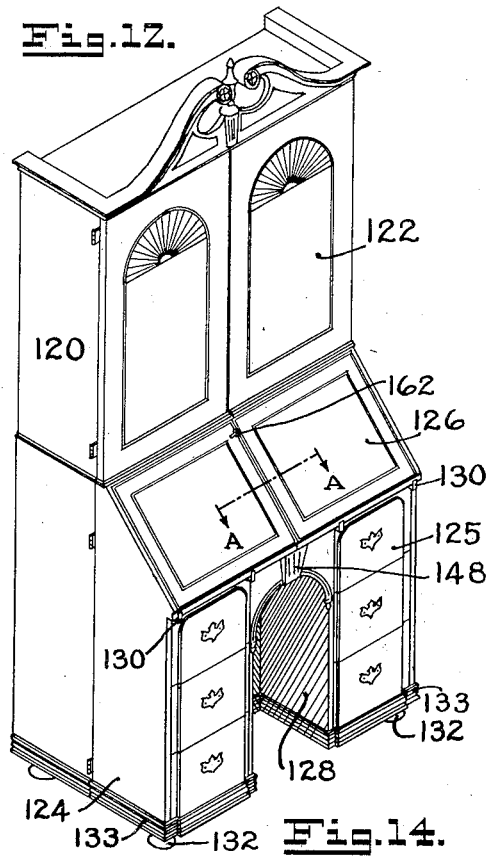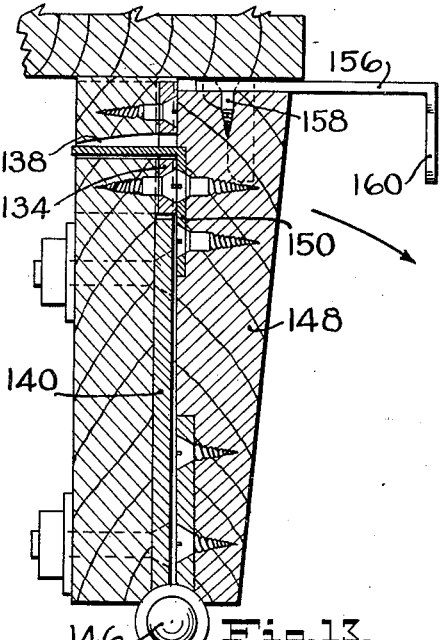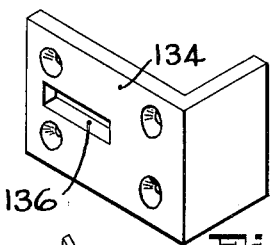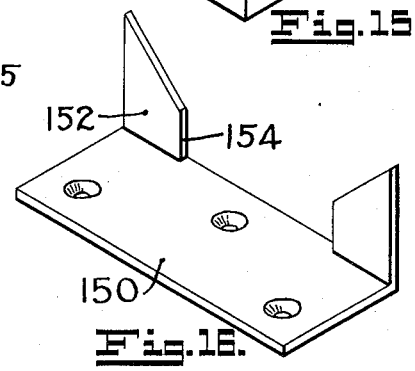

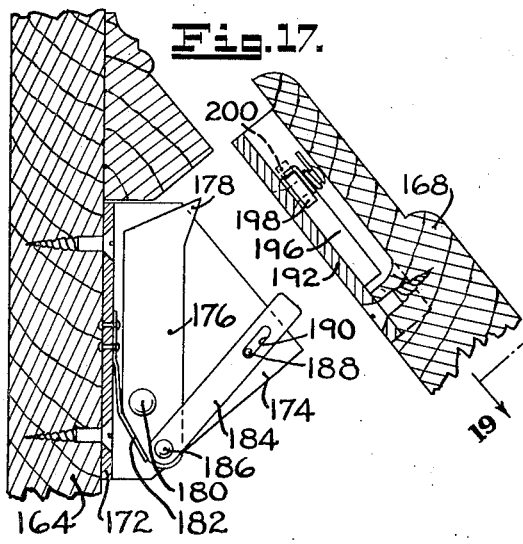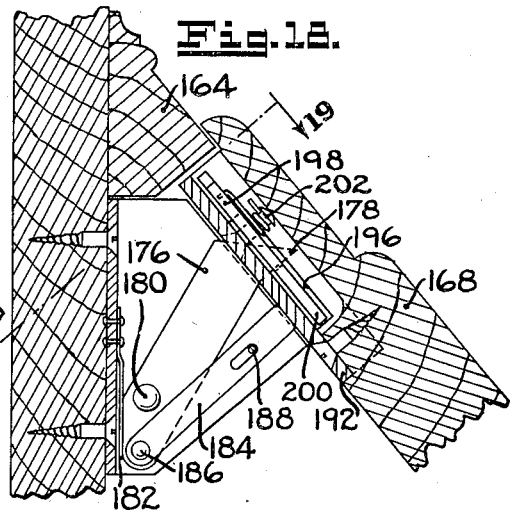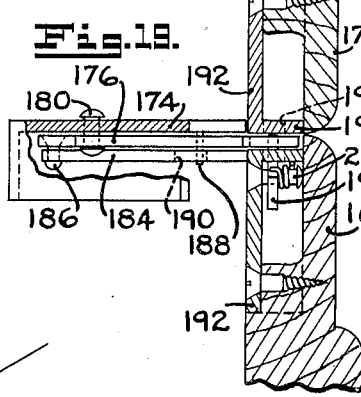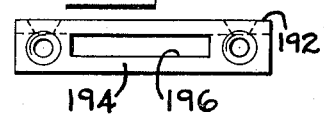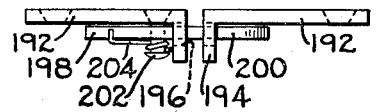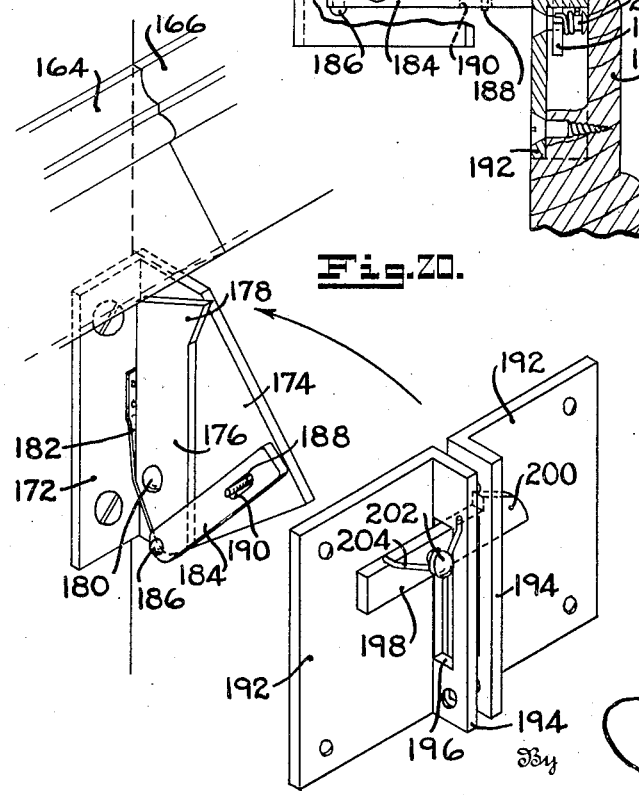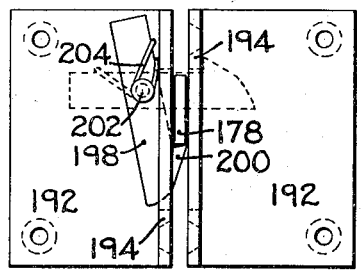

Patented Dec. 3, 1935

2,023,356

UNITED STATES PATENT OFFICE 2,023,356

CONCEALABLE FURNISHINGS

Walter C. Fain, Washington, D. C., assignor to
S. Lee Fain, Norfolk, Va.

Application December 1, 1932, Serial No. 645,292

18 Claims. (Cl. 155—124)

My invention relates to concealable furnishings, and more particularly to furnishings of this type comprising a table and bench units.

In my Patent No. 1,870,719, issued August 9, 1932, I have disclosed furnishings comprising a cabinet having hinged doors, a table mounted in the cabinet, and bench units mounted on the inner faces of the doors. Such an arrangement is very satisfactory when it is built into a wall and gives the appearance of a closet. On the other hand, such an arrangement is very noticeable and unsightly when merely placed against the wall as an article of furniture and is not at all suited to removable furniture constructions. For such use, the cabinet resembles no usual piece of living room furniture and looks awkward and out of place.

The principal object of my invention is to provide furnishings of this type which have the appearance when not in use of an ordinary piece of furniture such as might be present in any well furnished living room. More specifically, it is my purpose to make such an arrangement essentially similar to a secretary and capable of being used in the same manner as an ordinary secretary. I further provide a device which has substantially the same dimensions as the usual secretary and yet contains other furnishings in concealed position, preferably of a type ordinarily used in a dining room.

A further object is to provide a novel manner of mounting bench units on a support so that they can swing to a vertical position parallel to but spaced from the support, so that shelves or the like can be arranged on the support without interfering with the folding of the benches.

More specifically, my invention comprises a cabinet in which a table is hinged and doors for the cabinet with bench units hinged on the inner faces of the doors. The outer faces of the doors carry drawers, a desk lid, and brackets for supporting the desk lid. If desired, book shelves may be mounted on the upper portions of the doors, on the inner faces thereof but accessible from the outer faces.

A further object is to provide an arrangement which will hold the parts of the furniture in closed position, that is, in the form of a secretary, whenever the desk lid is open, but requiring only the closing of the lid to release such holding means. In addition, I may provide another locking means which resembles the keystone of the arch in a knee hole desk and which draws the two parts tightly together.

A final object of my invention is to provide a novel manner of supporting a device of this type so as to prevent all possibility of tipping when the parts are being moved to various positions.

Further objects and advantages of my invention will appear more fully from the following description when taken in conjunction with the accompanying drawings which form a part thereof.

In the drawings:

Fig. 1 is a perspective view of the upper portion of one form of the invention in closed position.

Fig. 2 is a side elevation of the same in open position.

Fig. 3 is a perspective view of the arrangement in partly open position.

Fig. 4 is a detail of the bench unit supporting means.

Fig. 5 is a cross section on the line 5—5 of Fig. 4.

Fig. 6 is a perspective view of a modified form of the invention in closed position.

Fig. 7 is a similar view in open position.

Fig. 8 is a similar view in partly open position.

Fig. 9 is a detail perspective of a portion of the arrangement.

Fig. 10 is a horizontal cross section through the drawers.

Fig. 11 is a detail view, partly in section, of one of the supports.

Fig. 12 shows a perspective a further modification.

Fig. 12A is a cross section on the line A—A of Fig. 12.

Fig. 13 is a cross section through a keystone lock in closed position.

Fig. 14 is a front elevation of the same in open position.

Fig. 15 shows in perspective one of the plates of the lock.

Fig. 16 shows the locking member in perspective.

Fig. 17 is a cross section through the desk lid latch in open or locked position.

Fig. 18 is a similar view of the lock in closed or unlocked position.

Fig. 19 is a cross section on the line 19—19 of Fig. 18.

Fig. 20 is a perspective showing the parts of the lock.

Fig. 21 is a side elevation of one of the lock members.

Fig. 22 is an end view of the latch portion of the lock.

Fig. 23 is an elevation of the same.

The invention includes a cabinet having a back wall 2 and side walls 4. A table 6 is hingedly mounted in the cabinet, for example in the manner shown in my aforesaid patent. The outer end of the table is supported by a leg 8, which folds into the position shown in broken lines in Fig. 2 when the table is out of use. Hinged to each side wall of the cabinet is a door formed of an upper section 10 and a lower section 12, which may be connected for joint movement by latches 14 of any suitable type. In the sections 10 are shelves 16 for books or the like, while doors 18 are hinged in the upper sections to permit access to these shelves. Below the shelves are arranged pigeonholes 20 opening to the outer face of the upper section. If desired, the central section of these pigeonholes may be made to simulate a closed compartment, as at 22.

Bench units comprising seats 24, legs 26 and a back 28 are hingedly mounted on the inner faces of the lower sections 12 for movement into vertical inoperative position (broken lines, Fig. 2) or horizontal operative position. In order to clear the shelves, these bench units must swing to a vertical position spaced from the upper section 10. As shown in Figs. 2, 4, and 5, I provide a vertical groove 30 in the lower door section which is closed by a plate 32 provided with a slot 34 of less width than the groove. Links 36, 38 extend through the slot 34 and are provided with angular end portions 40 within the groove 30, so as to guide the ends of the links in the groove. The lower link 36 is pivoted at its outer end to an intermediate point of the upper link 38. The free end of the link 38 is provided with an angular portion 42 to which the seat 24 is rigidly secured. Stops 44 are provided above and below the bench unit to limit swinging movement of the bench unit and to aid in guiding it to proper position.

On the outer faces of the lower sections 12 I provide desk sections 46. These desk sections each include a flat top portion 48 just below the pigeonholes which is covered, along with the pigeonholes, by the disk lid portions 50 hinged to the front edges of the flat portions. The lid may thus assume an angular position or a horizontal position in the plane of the top portion 48. Below the flat top, I provide brackets 52 slidable in the desk sections, two of these brackets being provided for each lid portion to support the same when in the position shown in Fig. 1. The lid portions are provided with latch means 53, 54 (see Figs. 17 to 23) which will be described below for holding them together so that the desk lid moves as a unit. Below the brackets, drawers 56 are slidably mounted, these drawers being provided with handles 58. A moulding 60 is mounted on the edge of one of the drawers and desk sections and covers the joint between the sections. The brackets may be moved manually or automatically to extended position.

For supporting the device, a cross bar 62 is secured to the lower edge of each side wall of the cabinet. Front and rear feet 64 support this bar. The cross bar extends in front of the cabinet and beneath the desk sections 46 when the arrangement is closed, thus giving the appearance of the normal feet of a secretary. During the swinging movement of the doors, the weight of the cabinet is far forward, but the bars extend in front of the cabinet and prevent it from tipping forward.

The arrangement for clamping the two sections carried by the doors tightly in closed position will be described below in connection with Figs. 12 to 16. This does not appear in Figs. 1 to 5.

When used as a secretary, the arrangement assumes the position shown in Fig. 1. When in this position, the desk lid 50 may be used for any desired purpose, and the pigeonholes 20 are available. The lid 50 may be closed, the two parts swinging as a unit, after which the brackets 52 are pushed in. The drawers may be opened, although because of the molding 60 which covers the junction line between the desk sections the right hand drawer must be opened with or before the left hand one. The doors 18 may be opened to give access to the book shelves 16.

When it is to be used as a table and bench unit, the desk lid is closed, the lock which holds the parts together is released and the doors are swung through 180°, the feet 64 preventing the device from tipping during this swinging movement. The latches 68 are released and the benches and table are swung down to horizontal operative position. The benches are guided by the mounting shown in Figs. 4 and 5 to assume the position shown in Fig. 2. When the legs rest on the floor, the back 28 is below the lower edge of the door section 10, as is the table 6, so that, by releasing the latches 14 the upper door sections may be swung back to the position shown at the right of Fig. 3. When the bench legs rest on the floor, the lower end 40 of the link 36 is slightly above the bottom of the groove 30, so that the legs form the sole support for the bench when in position for use.

Figs. 6 to 11 show a modified form of the invention. In these figures, 70 is the cabinet having side walls 72 on which are hinged doors 74. A table 76 is mounted in the cabinet in the same manner as in Figs. 1 to 5, but somewhat further forward so as to allow room for shelves 78 in the back of the cabinet. Bench units 80 having legs 82 are mounted on the inner faces of the doors 74 preferably in the manner shown in my aforesaid patent. Latches 84 are provided to hold the benches and table in raised inoperative position. Cross bars 86 and feet 88 are provided as in Figs. 1 to 5.

On the outer face of each door is a desk section 90 having drawers 92, a lid 94, brackets 96 and pigeonholes 98. In this form the pigeonholes are of relatively slight depth. Molding 100 covers the joint between the desk sections. The drawers are provided with handles 102, while the desk lid sections are connected to move as a unit by the latch described below.

The desk sections are held together by a latch 53, 54, this being a latch of the type shown in Figs. 17 to 23. In addition, a second lock is provided which makes it possible to exert considerable force and to draw the parts tightly together so that the line between the two sections is unnoticeable. This includes a pivoted member 106 simulating the front of a drawer and provided with a handle 107, the member 106 corresponding to the pivoted portion of the keystone latches described below. Drawers 109 may be placed on each side of the latch.

On the front of the cross bar 86 (Fig. 11) a ball 108 is provided to form a rolling contact so that the desk sections will swing easily. It will be understood that the latch and ball arrangements shown in Figs. 6 to 11 may be applied equally to the form shown in Figs. 1 to 5.

The operation of this modification is similar to that described above for the preferred form and need not be repeated.

Fig. 12 shows a knee hole desk having side walls 120 and doors 122. At the front of the doors are mounted drawer sections 124 and 125 and desk lid sections 126, the drawer sections being relatively narrow and cooperating to form an arch which produces the knee hole 128. Brackets 130 for supporting the lid sections are provided. Forwardly extending foot members having feet 132 of the general type shown in Fig. 11 are also used. These feet are largely concealed by a molding 133 around the bottom edges of the desk sections. Bench units of the type shown in the preceding figures are mounted on the inner faces of the doors.

Figs. 13 to 16 show the arrangment for holding the doors tightly closed. The left hand drawer section 124 carries a plate 134 at the meeting line between the two sections at the top of the knee hole arch. This plate has a slot 136 and an opening 138 is provided in the wood or other material behind the slot. The right hand section 125 carries a plate 140 opposite the plate 134 and having a corresponding slot 142 and the section has an opening behind the slot. The lower portion 144 of this plate overlaps the section 124 below the plate 134.

Hinged at 146 to the bottom edge of plate 140 is a block 148 shaped to simulate the keystone of the arch. This block carries on its inner face a plate 150 provided with prongs 152 having their inner edges inclined at the outer ends. These prongs are so spaced that when the desk sections are brought together their points will enter the slots 136 and 142 and the inclined edges will draw the two sections together as the keystone is pushed in. The straight portions 154 will hold the parts tightly closed. An efficient clamping action is thus secured.

To operate the keystone block, I provide a finger lever 156 pivoted at 158 on the upper surface of the block and provided with a bent end 160. This lever is normally arranged as shown in Fig. 14 and is scarcely noticeable. When it is desired to pull out the block, the lever may be moved by a finger inserted behind the bent end in the direction of the arrow (Fig. 14) to the position shown in Fig. 13. The hook 160 now gives a means for exerting sufficient pull on the keystone block to release it.

The two desk lid sections, as in the other forms shown, are connected by the latch shown in Figs. 17 to 23. One of these sections may be provided with a keyhole in which is a key 162 which may, if desired, be fixed in place to serve as a handle. The keystone block is pivoted to prevent its being mislaid, but obviously it could be a separate piece if desired.

In Figs. 17 to 23, which show a latch for holding together two parts of a desk lid, 164 and 166 represent members carried by the two doors which form the back wall of the portion which is closed by the desk lid while 168 and 170 indicate the desk lid sections. At the edge of the member 164 is secured a plate 172 having a portion 174 extending outwardly from its edge. A lever 176 having a nose 178 is pivoted at 180 on portion 174 and is normally pressed in a counterclockwise direction by the spring 182. A plunger 184 is pivoted at 186 to the other end of lever 176 and is guided by a pin 188 which engages slot 190 in the plunger. It will be obvious that the plunger is normally held at the limit of its outward movement, as shown in Fig. 17, by the spring 182.

The desk lid sections carry complementary plates 192 having their adjacent edges bent up as at 194, the plates being so mounted that when the lid sections are together the portions 194 will be spaced apart by an amount slightly greater than the thickness of nose 178. Slots 196 are formed in the portions 194. A latch member 198 having at its end a hook 200 is pivoted at 202 on one of the plates 192, preferably the plate which is secured to the lid portion 168. A spring 204 presses the latch towards the position shown in Fig. 20.

The purpose of the arrangement just described is to prevent separation of the desk lid sections and therefore opeing of the doors except when the lid is closed. The operation of the latch to produce this action should be clear. When the desk lid is open (Figs. 17, 20 and the broken line shown in Fig. 23) the spring 204 holds the hook 200 in position to engage over the edge of the slot 196 in the opposite plate 192. When the desk lid is closed, the plunger 184 is depressed (Figs. 18, 19, and 23) and the lever 176 pivots, its nose moving up between the portions 194 and striking the latch 198. This swings the latch to the full line position, Fig. 23, and disengages the two lid sections. The doors can then be opened, provided all other latches such as the keystone lock have been released. If the doors are not opened, the raising of the left hand lid portion by the key raises the right hand portion because of the overlap shown in Fig. 12A and thus permits the lever 176 to swing back and the latch 198 to reengage so that the parts are secured together as soon as the lid begins to open.

By this arrangement, the two lid sections are securely held together to move as a unit during use as a secretary, but when the lid is closed for the use of the interior furniture this latch need not be manipulated at all but works automatically to permit opening of the doors. Only the keystone latch need be operated for opening the doors to permit the use of the concealed furnishings.

It will be understood that the keystone latch may be applied to the type of constructions shown in Figs. 1 to 11, for example by pivoting the member 106 of Fig. 6 along one of its edges and providing it with prongs of the type shown in Figs. 13 to 16. The desk lid latch may also be used with the various modifications described or in other forms.

In the forms shown in Figs. 6 and 12, as shown in Fig. 7 drawers 210 for silver or other articles may be provided in the space behind the table.

While I have described herein some embodiments of my invention, I wish it to be understood that I do not intend to limit myself thereby except within the scope of the appended claims.

I claim:

1. In concealable furnishings, a movable cabinet, a table collapsibly mounted in said cabinet, doors mounted on said cabinet for closing the front thereof, bench units collapsibly mounted on the inner faces of said doors, and complementary portions mounted on the outer faces of said doors shaped to give together the appearance of the front of and to serve the functions of a secretary when the doors are closed.

2. In concealable furnishings, a movable cabinet, a table mounted in said cabinet and movable to an inoperative position within the cabinet or to a horizontal operative position extending from the cabinet, doors hinged to said cabinet to close the front thereof, bench units mounted on the inner faces of said doors and movable to an inoperative position or to a horizontal operative position, drawers mounted on the outer faces of said doors, complementary parts forming a horizontal surface above said drawers and complementary parts forming a lid hinged at one edge of said surface movable to an angular closing position above said surface and to a horizontal operative position substantially in alignment with said surface, whereby said furnishings when in closed condition simulate a secretary.

3. In furnishings as claimed in claim 2, a pair of brackets slidably mounted on each of said doors below each of said lid parts.

4. In concealable furnishings, a movable cabinet, a table mounted in said cabinet and movable to an inoperative position within the cabinet or to a horizontal operative position extending from the cabinet, doors hinged to said cabinet to close the front thereof, bench units mounted on the inner faces of said doors and movable to an inoperative position or to a horizontal operative position, elements of considerable depth on the outer faces of and extending in front of the hinges of said doors, and supporting members secured to the under side of said cabinet, said supporting members extending in front of the cabinet and beneath said elements when the doors are closed to prevent tipping said cabinet as the doors are opened.

5. In furniture, a movable cabinet, doors pivoted on said cabinet about vertical axes for closing the front of the cabinet, complementary portions mounted on the outer faces of the doors shaped to give together the appearance of and to serve the functions of the front of a secretary when the doors are closed and extending in front of the pivotal axes of the doors, and supporting members for said cabinet, said supporting members secured to and extending in front of the cabinet and beneath said complementary portions, and collapsible furnishings mounted on the inner faces of said doors.

6. In furniture including a support and a member mounted on said support movable to two positions and formed in two sections, means controlled by the movement of said member to lock the sections together when said member is in one position but to release the sections when said member is in another position.

7. In furniture, a secretary including two separable parts, a desk lid section carried by each of said parts, means normally securing said lid sections together, and means automatically controlled by the movement of the desk lid to closed position to release said securing means.

8. In furniture, a knee hole secretary formed in two sections the line of separation being substantially at the crown of the knee hole arch, and means at said crown to secure the sections together.

9. In furniture, a knee hole secretary formed in two sections the line of separation being substantially at the crown of the knee hole arch, and means at said crown to secure the sections together, said means including a movable block shaped to simulate the keystone of the arch.

10. In furniture, a knee hole secretary formed in two sections the line of separation being substantially at the crown of the knee hole arch, and means at said crown to secure the sections together, said means including a movable block shaped to simulate the keystone of the arch, and wedge means carried by said block engaging means on said sections to draw together the sections.

11. In combination, a cabinet, doors for closing the front of said cabinet, drawer and desk lid sections mounted on the outer faces of said doors and shaped to give together the appearance of a secretary when the doors are closed, supporting members beneath said cabinet extending in front of the cabinet and beneath said drawer sections, cooperating means near the tops of said drawer sections and at the inner edges thereof to wedge the sections together and hold the doors closed, means normally securing said desk lid sections together, and automatic means to release said securing means when the desk lid is moved to closed position.

12. In combination, a cabinet, doors for closing the front of said cabinet, drawer and desk lid sections mounted on the outer faces of said doors and shaped to give together the appearance of a secretary when the doors are closed, means normally securing said desk lid sections together, and automatic means to release said securing means when the desk lid is moved to closed position.

13. In furniture, a knee hole secretary formed in two sections the line of separation being substantially at the crown of the knee hole arch, separate desk lid sections mounted above said knee hole, and means to secure the sections together.

14. In furniture, a cabinet, doors closing the front of the cabinet, and sections mounted on the outer faces of said doors forming together the lower portion of a knee hole secretary, said sections being divided substantially at the crown of the knee hole arch, and means to secure the sections together.

15. In furniture, a knee hole secretary formed in two sections the line of separation being substantially at the crown of the knee hole arch, and means at said crown to secure said sections together, said means including a block pivoted on one of said sections carrying means thereon to engage means on the two sections and hold them in closed position.

16. Concealable furnishings comprising a movable cabinet, closure means for the front of said cabinet, said closure means having the appearance of the front of an article of furniture normally used in a living room and including normally movable parts of such an article, said closure means being pivotally movable to permit access to the interior of the cabinet, furniture ordinarily used in a dining room collapsibly mounted in the interior of said cabinet and other dining room furniture collapsibly mounted on the rear face of said closure means.

17. In furniture, a cabinet, the front of which has the appearance of an article of furniture normally used in a living room, said front comprising closure means pivotally movable to permit access to the interior of the cabinet, said closure means being supported by said cabinet out of contact with the floor, means for contacting the floor in front of the cabinet and thereby preventing said cabinet from tipping forward, said means being secured to and extending in front of the cabinet and beyond the axis of said closure means, a dining room table collapsibly mounted in said cabinet and connected thereto, benches at the sides of the cabinet, and means at the front of the cabinet mounting the benches to swing forwardly on a vertical axis and then on a horizontal axis for movement to positions in which the benches are at the opposite sides of the table.

18. In furniture, a cabinet, the front of which has the appearance of an article of furniture normally used in a living room and including normally movable parts of such an article, said front comprising closure means pivotally movable to permit access to the interior of the cabinet, supporting members for said cabinet, said supporting members being secured to and extending in front of the cabinet and beyond the axis of said closure means, and a dining room table and bench collapsibly mounted in said cabinet and connected thereto and movable to positions in which the bench is at the side of the table.

WALTER C. FAIN.